United States Patent
Simpson et al.

(10) Patent No.: US 9,203,524 B2
(45) Date of Patent: Dec. 1, 2015

(54) METHODS, SYSTEMS, AND COMPUTER READABLE MEDIA FOR PROVIDING SMART UNDERWATER FREE SPACE OPTICAL COMMUNICATIONS

(71) Applicant: North Carolina State University, Raleigh, NC (US)

(72) Inventors: Jim Anto Simpson, Annapolis, MD (US); John F. Muth, Raleigh, NC (US)

(73) Assignee: NORTH CAROLINA STATE UNIVERSITY, Raleigh, NC (US)

( * ) Notice: Subject to any disclaimer, the term of this patent is extended or adjusted under 35 U.S.C. 154(b) by 6 days.

(21) Appl. No.: 14/133,112

(22) Filed: Dec. 18, 2013

(65) Prior Publication Data
US 2014/0248058 A1 Sep. 4, 2014

Related U.S. Application Data

(60) Provisional application No. 61/738,862, filed on Dec. 18, 2012.

(51) Int. Cl.
  *H04B 10/00* (2013.01)
  *H04B 13/02* (2006.01)
  *H04B 10/112* (2013.01)

(52) U.S. Cl.
  CPC ............. *H04B 13/02* (2013.01); *H04B 10/112* (2013.01)

(58) Field of Classification Search
  CPC ..................................................... H04B 10/112
  USPC .......................................... 398/122, 129, 131
  See application file for complete search history.

(56) References Cited

U.S. PATENT DOCUMENTS

| 5,347,387 | A   | * | 9/1994  | Rice .................................. 398/129 |
| 8,045,859 | B2  | * | 10/2011 | Bandyopadhyay ........... 398/104 |
| 8,412,048 | B2  | * | 4/2013  | Dunlap ............................. 398/104 |
| 8,953,944 | B2  | * | 2/2015  | Machado et al. .............. 398/104 |
| 2006/0182448 | A1 | * | 8/2006 | Chalfant et al. ............... 398/131 |
| 2008/0303977 | A1 | * | 12/2008 | Sekiguchi et al. ............. 349/64 |
| 2008/0317474 | A1 | * | 12/2008 | Wang et al. .................... 398/129 |

(Continued)

OTHER PUBLICATIONS

Pontbriand et al., "Diffuse High-Bandwidth Optical Communications," IEEE Oceans Conference, pp. 1-4, (Sep. 2008).

(Continued)

*Primary Examiner* — Danny Leung
(74) *Attorney, Agent, or Firm* — Jenkins, Wilson, Taylor & Hunt, P.A.

(57) ABSTRACT

Methods, systems, and computer readable for providing smart underwater free space optical communications are provided. According to one aspect, a system for smart underwater free space optical communications is provided. The system includes a receiver. The receiver includes an optical detector array for detecting incident light under water. The receiver further includes a compound lens array located optically in front of the optical detector. The compound lens array includes lenses that steer incident light arriving at different angles to different portions of the optical detector array. A controller processes signals generated by the optical detector based on the incident light and controls an aspect of the underwater communications based on the steered incident light detected by the detector array. Components of the controller may include a backscatter estimator and an angle of arrival estimator for estimating water quality obtained from backscattered light and an angle of arrival of incident light, respectively.

22 Claims, 19 Drawing Sheets

(56) References Cited

U.S. PATENT DOCUMENTS

| | | | |
|---|---|---|---|
| 2012/0170935 A1* | 7/2012 | Machado et al. | 398/58 |
| 2013/0315604 A1* | 11/2013 | LoPresti et al. | 398/116 |
| 2014/0003817 A1* | 1/2014 | Roberts et al. | 398/74 |
| 2014/0248058 A1* | 9/2014 | Simpson et al. | 398/104 |

OTHER PUBLICATIONS

Cochenour et al., "Phase Coherent Digital Communications for Wireless Optical Links in Turbid Underwater Environments," IEEE Oceans Conference, Canada, pp. 1-5, (2007).

Doniec et al., "AquaOptical: A Lightweight Device for High-rate Long-range Underwater Point-to-Point Communication," IEEE Oceans Conference, pp. 1-6, (Oct. 26-29, 2009).

Hanson et al., "High Bandwidth Underwater Optical Communication," Applied Optics, vol. 47, No. 2, pp. 277-283, (Jan. 2008).

Cox, Jr., William Charles, "A 1 Mbps Underwater Communication System Using a 405 nm Laser Diode and Photomultiplier Tube," M.S. thesis, North Carolina State University, Raleigh, (2007).

Simpson, Jim Anto, "A 1 Mbps Underwater Communications System using LEDs and Photodiodes with Signal Processing Capability," M.S. thesis, North Carolina State University, Raleigh, (2007).

Cox, Jr., William Charles, "Stimulation, Modeling, and Design of Underwater Optical Communication Systems," Ph.D. dissertation, North Carolina State University, Raleigh, (2012).

Cochenour et al., "Characterization of the Beam-Spread Function for Underwater Wireless Optical Communi-cations Links," IEEE Journal of Oceanic Engineering, vol. 33, No. 4, pp. 513-521, (Oct. 2008).

Mullen, et al., "Investigation of the Effect of Scattering Agent and Scattering Albedo on Modulated Light Propagation in Water," Applied Optics, vol. 50, No. 10, pp. 1396-1404, (Mar. 2011).

Everett, Jared Scott, "Forward-Error Correction Coding for Underwater Free-Space Optical Communication," M.S. thesis, North Carolina State University, Raleigh, (2009).

Simpson et al., "Mbps Optical Wireless Communication with Error Correction Coding for Underwater Sensor Nodes," IEEE Oceans Conference, pp. 1-4, (2010).

Rabinovich et al., "A Cat's Eye Multiple Quantum-Well Modulating Retro-Reflector," IEEE Photonics Technology Letters, vol. 15, No. 3 pp. 461-463, (Mar. 2003).

Cox et al., "A MEMS Blue/Green Retroreflecting Modulator for Underwater Optical Communications," IEEE Oceans Conference, pp. 1-4, (2010).

Akella et al., "Building Blocks for Mobile Free-Space-Optical Networks," in International Conference on WOCN, pp. 1-5, (2005).

Servincer et al., "Prototyping Multi-Transceiver Free-Space Optical Communication Structures," IEEE International Conference on Communications, pp. 1-5, (2010).

Tang et al., "Wireless Infrared Communication Links Using Multi-Beam Transmitters and Imaging Receivers," IEEE International Conference on Communications, pp. 180-186, (Jun. 1996).

Carruthers et al., "Angie Diversity for Nondirected Wireless Infrared Communication," IEEE Transactions on Communications, vol. 48, No. 6, pp. 960-969, (Jun. 2000).

Simpson et al., "A Spatial Diversity System to Measure Optical Fading in an Underwater Communications Channel," IEEE Oceans Conference, pp. 1-6, (2009).

Prucnal et al., "Spread Spectrum Fiber-Optic Local Area Networking Using Optical Processing," Journal of Lightwave Technology, vol. LT-4, No. 5, pp. 547-554, (May 1986).

Haubrich, et al., "Instrumentation to Measure the Backscattering Coefficient bb for Arbitrary Phase Functions," Applied Optics, vol. 50, No. 21, pp. 4134-4147, (Jul. 2011).

* cited by examiner (a) FOV of a bare photodiode (active area diameter of 2.65 mm).

(b) FOV of a 1" lens-photodiode pair. Photodiode is at focus.

(a) User A (Code 1) *on*, User C (Code 3) *off*

(b) User A (Code 1) *off*, User C (Code 3) *on*

(c) User A (Code 1) *on*, User C (Code 3) *on*

METHODS, SYSTEMS, AND COMPUTER READABLE MEDIA FOR PROVIDING SMART UNDERWATER FREE SPACE OPTICAL COMMUNICATIONS

PRIORITY

This application claims the benefit of U.S. Provisional Patent Application Ser. No. 61/738,862, filed Dec. 18, 2012; the disclosure of which is incorporated herein by reference in its entirety.

GOVERNMENT INTEREST

This invention was made with government support under Grant Nos. N00173-07-1-G904 and STTR N00014-07-M-0308 awarded by the Office of Naval Research and Grant Nos. CCF-05150164 and ECCS-0636603 awarded by the National Science Foundation. The government has certain rights in the invention.

TECHNICAL FIELD

The subject matter described herein includes methods, systems, and computer readable media for providing smart underwater free space optical communications.

BACKGROUND

Underwater free space communication systems are systems where two or more devices communicate through water without using an interconnecting cable. Radio frequency communications are attenuated in sea water, which has led to the use of optical systems for underwater free space communications. Problems associated with the use of optical communications in underwater free space communications systems include variations in water quality, design complexity, and power consumption. Because water quality can vary, transmitters and receivers for underwater optical communications are preferably able to adapt to varying water quality. Regarding design complexity, because free space communications are line-of-sight, complex mechanical pointing and tracking apparatuses to point transmitters and receivers towards each other can be used. However, using complex pointing and tracking apparatuses increases the design complexity of underwater devices and also increases power consumption. Increasing power consumption can decrease the operating time between rechargings for battery-powered underwater vehicles, such as autonomous underwater vehicles (AUVs).

Accordingly, in light of these difficulties, there exists a need for methods, systems, and computer readable media for providing smart underwater free space optical communications.

SUMMARY

Methods, systems, and computer readable for providing smart underwater free space optical communications are provided. According to one aspect, a system for smart underwater free space optical communications is provided. The system includes a receiver. The receiver includes an optical detector array for detecting incident light under water. The receiver further includes a compound lens array located optically in front of the optical detector. The compound lens array includes lenses that steer incident light arriving at different angles to different portions of the optical detector array. A controller processes signals generated by the optical detector based on the incident light and controls an aspect of the underwater communications based on the steered incident light detected by the detector array.

The subject matter described herein for providing smart underwater free space optical communications may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawing, wherein like reference numerals represent like parts, of which.

DETAILED DESCRIPTION

Figure 1A:
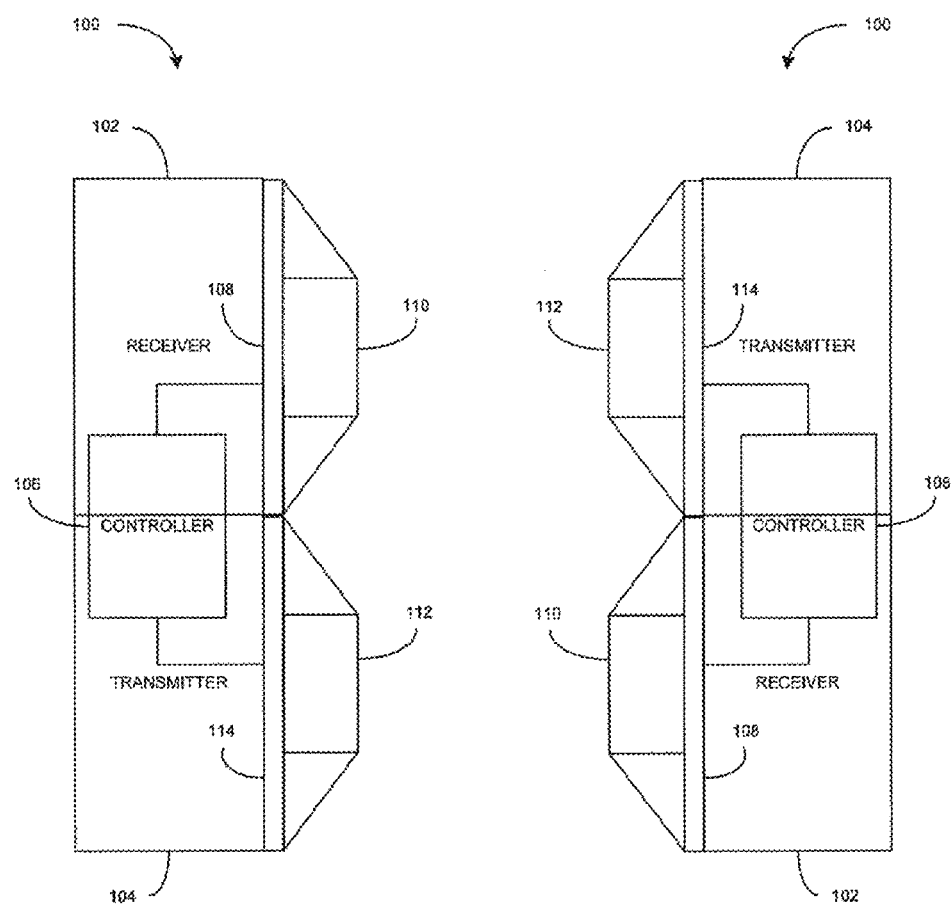
FIG. 1A is a block diagram illustrating an exemplary smart underwater free space optical communications system according to an embodiment of the subject matter described herein.

In accordance with the subject matter disclosed herein, systems, methods, and computer readable media for smart underwater free space optical communications are provided. FIG. 1A is a block diagram illustrating an exemplary smart underwater free space optical communications system according to an embodiment of the subject matter described herein. In FIG. 1A, the system includes optical transmitter/receiver pairs 100 configured to communicate with each other using underwater free space optical communications. Each transmitter/receiver pair 100 includes a receiver 102, a transmitter 104, and a controller 106. Each transmitter/receiver pair 100 may be a component of an underwater vehicle, such as an AUV. In an alternate example, any receiver 102 or transmitter 104 can be a component of a stationary underwater object, such as a buoy. Each receiver 102 includes a detector array 108 and a compound lens array 110, as described below. In one embodiment, each detector array 108 includes a photodiode array, and compound lens array 110 includes a truncated hexagonal pyramid having a lens on each face (other than the base) for steering incident light of particular incident angles or particular areas of detector array 108. Alternatively, rather than including a photodiode array, each detector array 108 may include a photomultiplier tube array, or other array of detectors of photons.

Each controller 106 may be configured to control an aspect of underwater communications based on signals generated by detector array 108. In one example, controller 106 may control the attitude of an underwater vehicle to maximize transmission efficiency or bandwidth. In another example, each controller 106 may control the velocity of an underwater vehicle as it passes another vehicle or stationary object with which it is communicating. Also, as stated below, each controller 106 may adjust the data rate, the transmit power and/or the code rate based on estimates of water quality obtained from backscattered light.

Figure 18:
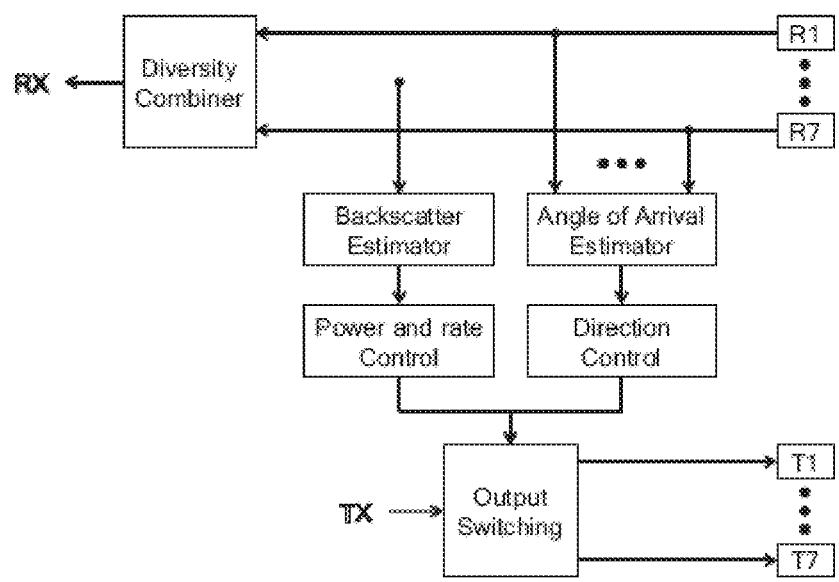
FIG. 18 illustrates a closed-loop system architecture of smart-transceiver. The transmitter is capable of direction, output power, and rate control, based on feedback from backscatter and angle of arrival estimator at the receiver.

As stated above, each controller 106 may control an aspect of underwater communications based on the incident light. In FIG. 18, exemplary components of controller 106 are shown. The components include a backscatter estimator and an angle of arrival estimator for estimating backscattered light and angle of arrival of incident light, respectively. Each controller 106 further includes a power and rate control module for adjusting transmit power, data rate, or code rate based on backscattered light. Each controller 106 further includes a direction controller for controlling direction or attitude of the underwater vehicle based on the angle of arrival of incident light.

Each transmitter 104 may include a compound lens array 112 and a transmitting element array 114. Compound lens array 112 may be configured to converge the wide field of view of a transmitting element to a narrower beam and in a particular direction. Transmitting element array 114 may be an array of transmitting elements, such as light-emitting diodes, to produce transmitted light. The light-emitting diodes may be of different wavelengths for code division multiple access (CDMA) or other multi-user transmission schemes. In one example, compound lens array 112 comprises a truncated hexagonal pyramid with each face other than the base corresponding to a transmitting LED.

Because the subject matter described herein uses a compound lens array and a detector array to steer light arriving from different angles onto different detectors, complex mechanical systems, such as a gimbal and pointing stage are not necessary. As a result, the smart communications systems described herein may use less energy than underwater optical communications systems that require such mechanical systems. In addition, because smart underwater free space optical communications systems according embodiments of the subject matter described herein is capable of estimating water quality and adjusting transmit parameters based on the estimated water quality, power and energy are conserved.

The following sections describe exemplary details of smart transmitters and receivers for underwater free space optical communication according to an embodiment of the subject matter described herein.

I. Introduction

Underwater communication is of great interest to military, industry, and scientific communities. Underwater vehicles, sensors, and observatories require a communications interface with data rates in the few to tens of Mbps. While fiber optic or copper cabling can be used for sufficiently large or stationary devices, a wireless link is desirable in many situations. Radio frequencies are heavily attenuated in seawater. Acoustic communication is the existing prevalent method but suffers from low data rates, high latencies, and multipath issues. For short-range links, free-space optical communications is a promising alternative.

Recently, underwater free-space optical communication has witnessed a surge in interest from developments in blue-green sources and detectors [1],[2],[3],[4]. These take advantage of the "blue-green optical window" of relatively low attenuation of blue-green wavelengths of the electromagnetic spectrum underwater. Laser-based systems have been demonstrated for extended ranges, high data rates and low latencies [5]. LED-based systems have been demonstrated for low-cost, low-power, and compact systems [6].

Underwater free-space optical communication is typically considered point-to-point and, thus far, most researchers have treated it as such. Point-to-point links require strict pointing and tracking, especially on mobile platforms. This is reasonable in systems that use collimated laser links and are large enough to afford dedicated gimbal systems. Some systems also use very large aperture (~20 inch) photomultiplier tubes (PMTs) that increase the receiver field of view (FOV) [1].

In some situations, however, compact systems are desired. Smaller platforms with compact systems do not have the volume or energy budget for sophisticated pointing and tracking. Large-area PMTs can be expensive and bulky. In the presence of multiple users or strong background ambient light a single-output wide FOV can also be a disadvantage.

In traditional RF wireless, smart antennas are an integral part of most mobile communications standards, such as 4G LTE Advanced. Smart antennas are capable of signal processing to provide angle of arrival information and transmit beam-forming. In indoor optical wireless, multiple antennas with spatial and angular diversity are used for non-line-of-sight communications, ambient light rejection, electronic pointing and tracking, relative localization, and multi-hop networking. It is natural to consider the benefits of such techniques extended to the underwater environment.

In the description herein, we propose a new optical front-end for underwater free-space optical communication. The new front-end introduces the concept of smart receivers and transmitters. The smart receivers have segmented wide FOV and are capable of detecting angle of arrival of signals in order to adjust and orient FOV towards the desired signal. The smart transmitters are capable of using this information to electronically steer its output beam towards a particular direction. The smart transmitters are also capable of estimating water quality from its backscattered light collected by its co-located receiver. This can be used to adapt to changing water conditions. The transmitter outputs are also code division multiple access (CDMA) coded for operation in a multi-user environment.

II. Benefits of Smart Optical Systems for Uuvs

Smart receivers and transmitters are the physical layer enabling technology for coordinated sensing and communicating, and the focus of the subject matter described herein. As an example, consider smart optical transmitters and receivers that can estimate the apparent optical properties of water, send a beam of light in a desired direction, and determine the direction and identity of light that is being received. This information can then be used in many different phases of an underwater vehicle's operation. Determining the water quality can be used to adaptively change the power of transmission or gain of the receiver during detection and acquisition of another platform. Knowledge of vehicle orientation, identity, and relative angle can be used to localize and determine the relative positions of vehicles. Brief descriptions of potential benefits are listed in sections A-F below.

A. Non-Mechanical Pointing and Tracking on a Moving Underwater Vehicle

Depending on the sea state and the controls of an underwater vehicle, an optical transmitter or receiver mounted on it can go in and out of alignment with another stationary or mobile platform as the vehicle moves. An optical front-end capable of changing its effective FOV, detecting angle of arrival at its receiver, as well as electronically steer its output beam, can potentially maintain a communications link in such an environment. Furthermore, one can utilize signal diversity techniques to improve signal reliability.

B. Maintaining Link with a Stationary Node as an Underwater Vehicle does a Drive-by Station keeping and maintaining a precise relative position can be energy intensive and difficult for underwater vehicles. The ability to interrogate and collect data from a stationary sensor node as a vehicle drives by can add significant operational capability. Thus, a quasi-omnidirectional receiver capable of continually adapting its FOV and optical power is of value.

C. Providing Sensory Information to Underwater Vehicles

In a swarm environment, localization information can be gathered from angle of arrival information as various nodes talk to each other. This information can be passed to the vehicle to augment its other sensory information for navigation and collision avoidance purposes. A smart optical front-end can also provide other sensory information such as water quality measurements obtained from the communications link.

D. Duplex Multi-User System

Each transceiver consists of a smart receiver and a smart transmitter. Spatial diversity allows for simultaneous reception from two non-co-located transmitters. Since each transmitter is CDMA coded, the smart receiver at B is also capable of associating A and C data streams with their corresponding directions. In the event that A and C are co-linear, the CDMA code still allows for separating the two transmit streams at the receiver on B.

Figure 1B:
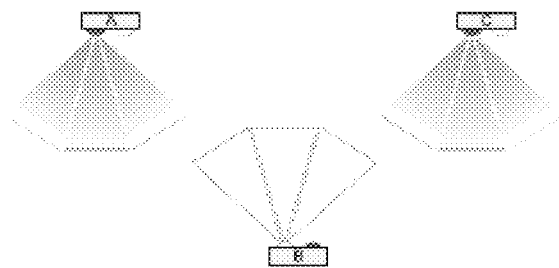
FIG. 1B illustrates a multi-user reception system scenario with three nodes. A & C are transmitting. B is receiving. Note: Only three field of views (channels) per user are shown, for clarity.

In a mesh network scenario, as illustrated in FIG. 1B, users A and C are not within range of each other. Assuming localization information from angle of arrival is kept at each node, B can relay messages between A and C through a hop network. If B is a mobile node, it can be positioned to effectively extend the optical communication range between A and C when needed.

E. Optical Backscatter Estimation to Assess Water Quality

Figure 2:
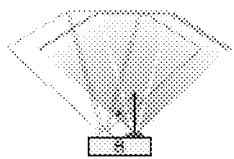
FIG. 2 illustrates optical backscatter estimation at B from its co-located transmitter.

The duplex system provides a way for a receiver to monitor optical backscattering while its co-located transmitter is active, as illustrated in FIG. 2. Based on the modulation scheme used, steps would need to be taken to isolate background, interference, and unmodulated light. Using volume scattering information, an estimate of the attenuation coefficient can be made based on the measured amount of backscatter. This complements SNR measurements that can be obtained from the tx/rx signals.

F. Electronic Switched Pointing & Tracking

Figure 3:
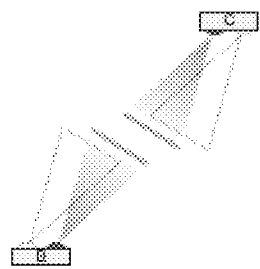
FIG. 3 illustrates electronic switched pointing & tracking. B can sense the direction of C and point.
Figure 4:
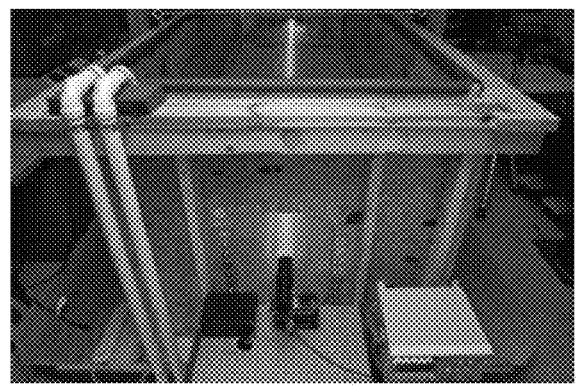
FIG. 4 illustrates a 1000 gallon water tank built and used for underwater free-space optical communication experiments done in lab at NCSU.

Angle of arrival information at a receiver is passed along to its co-located transmitter. The transmitter can then switch to a beam that points its output in the direction of the incoming beam to optimize the link, as illustrated in FIG. 3.

III. Background

A. Underwater Optical Channel

The underwater free-space optical channel is very different from the atmospheric channel. While there have been extensive studies on the optical properties of water, the focus of most of these studies has been on the geo-physical, bio-optical, and remote sensing applications. Thus, the underwater channel from an optical communication perspective is still very much unknown. Nonetheless, a good overview of the properties can be obtained from literature [7], [8], [9].

TABLE 1

EXAMPLE ATTENUATION COEFFICIENTS

| Water Type | c (1/m) |
|---|---|
| Clear ocean | 0.152 |
| Coastal ocean | 0.399 |
| Harbor water | 2.195 |

From an optical communications perspective, the three important properties are beam attenuation coefficient, volume scattering function, and albedo. Light interacts with water and the materials suspended and dissolved in it in two different ways: absorption and scattering. Absorption is the change of electromagnetic radiation into other forms of energy such as heat. Scattering is the redirection of electromagnetic radiation. Photons essentially change their direction by means of reflection, refraction, and diffraction. In small particles, Mie and Rayleigh scattering determine the magnitude and direction of the scattered photon [7]. This dependence can be described by a phase function. In water, the phase function is usually strongly forward peaked. There can also be a significant backscattered component [10].

1) Beam attenuation coefficient: The ratio of energy absorbed or scattered from an incident power per unit distance is defined as beam attenuation coefficient. It denotes the total energy lost and can be shown to be the sum of the absorption and scattering coefficients, $a(\lambda)$ and $b(\lambda)$. It has units of $m^{-1}$ and is denoted by $c(\lambda)$.

$$c(\lambda) = a(\lambda) + b(\lambda) \tag{1}$$

Beer's law defines the attenuation of an optical signal as a function of attenuation coefficient and distance d as:

$$I = I_0 e^{-c(\lambda)d} \tag{2}$$

where I is the intensity at the receiver and $I_0$ is the intensity at the transmitter. The exponential term, $c(\lambda)d$, is called attenuation length and is a unitless term that expresses the exponential loss of light in water.

2) Single-scattering albedo: Single-scattering albedo is defined as the ratio of scattering coefficient to beam attenuation coefficient and denotes the probability that a photon will be scattered rather than absorbed. It is a unitless term and is denoted by $\omega_0$. It is defined as $$\omega_o \equiv \frac{b(\lambda)}{c(\lambda)} \tag{3}$$

As expected, highly (primarily) scattering environments result in an albedo close to 1, and highly (primarily) absorbing environments result in an albedo close to 0. Since scattered photons are not converted to other forms of energy, single-scattering albedo is also known as the probability of photon survival.

3) Volume scattering function: The volume scattering function (VSF) is defined as the fraction of scattered power ($\Phi_s$) to incident power ($\Phi_i$) as a function of direction $\psi$ scattered into a solid angle $\Delta\Omega$. It has units of $m^{-1}\,sr^{-1}$ and is denoted by $\beta(\psi, \lambda)$.

$$\beta(\psi, \lambda) = \frac{d\left(\frac{\Phi_s(\psi, \lambda)}{\Phi_i(\lambda)}\right)}{dr\,d\Omega} \tag{4}$$

B. Underwater Freespace Optical Communication

We have previously developed systems for underwater free-space optical communication that use laser sources and photomultiplier tubes as detectors [5] as well as LEDs and photodiodes [6], both capable of implementing digital signal processing techniques.

Figure 5:
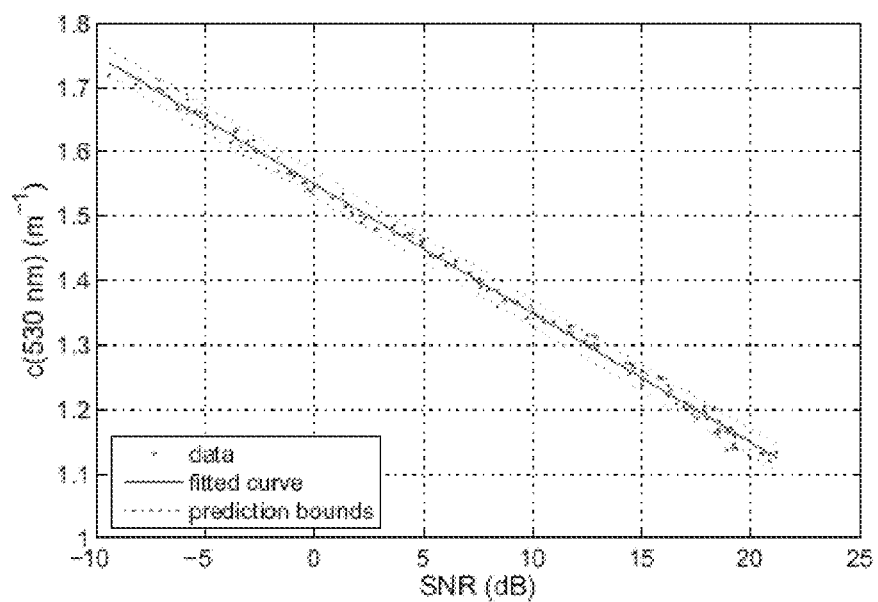
FIG. 5 Illustrates the relationship between attenuation coefficient and SNR for experiments in laboratory test tank. Attenuation and albedo are controlled by introducing measured amounts of scattering particles such as liquid Maalox and Nigrosin dye to mimic ocean water.
Figure 6:
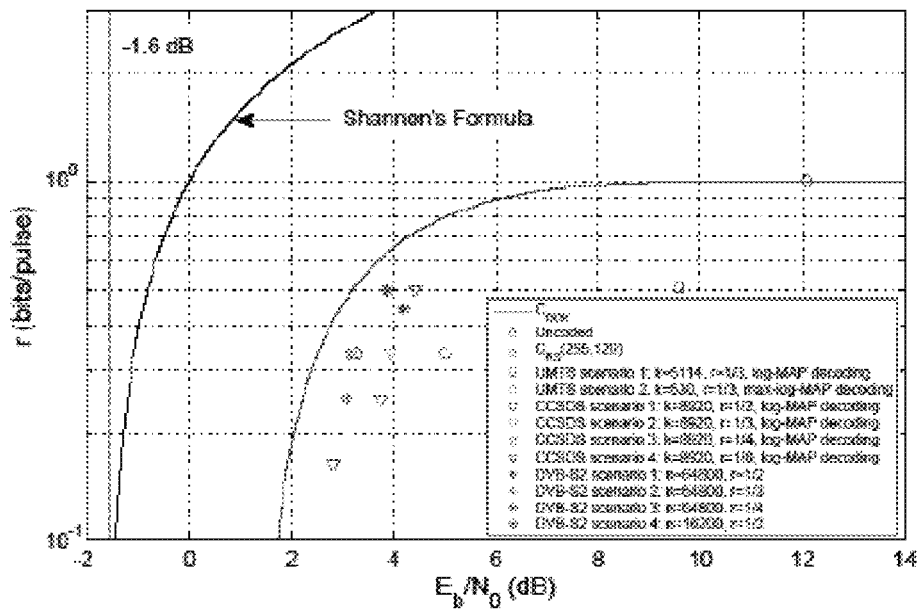
FIG. 6 illustrates experimental performance of various error correction codes implemented for underwater free-space optical communication at NCSU as a function of code rate vs. performance in $E_b/N_0$ at a BER of $10^{-4}$.
Figure 7:
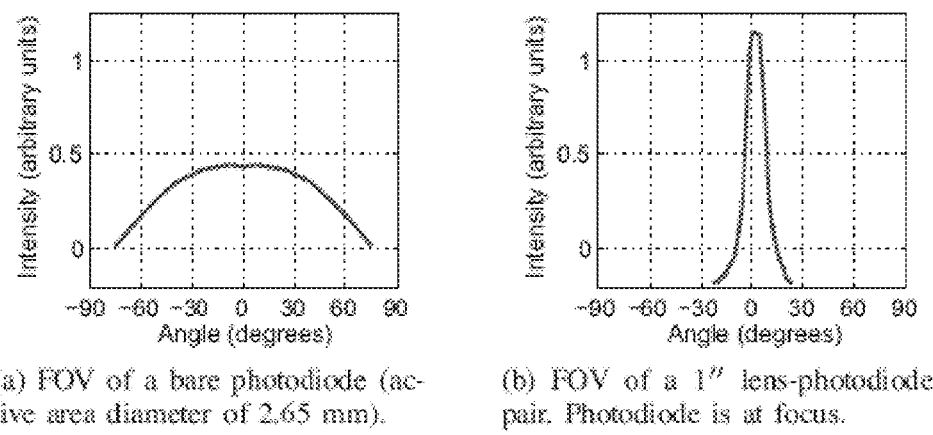
FIG. 7 illustrates a comparison of field of view and light collecting ability of a bare photodiode (a) vs. a lens-photodiode pair (b) shown to illustrate the gain in light collection by using a lens, but at the expense of FOV. FOV decreases from ~120° to ~10°.

For laboratory testing, a 3.66 m long, 1.22 m wide, 1.22 m tall indoor water tank was constructed. Maalox, a commercial antacid was added as a scattering agent. The addition of Maalox controls the attenuation coefficient of water, while absorption can be independently controlled by adding Nigrosin dye to control the albedo [11]. During the progression of an experiment, Maalox was added in a controlled manner using a programmable syringe pump. The resulting sweep results in a reproducible relationship between attenuation coefficient and the electrical signal-to-noise ratio (SNR) of the received signal as shown in FIG. 5.

On compact platforms that we have built, to improve the performance of the links, forward error correction was added and theoretical and experimental performance was compared [12], [13]. Reed-Solomon, turbo, and low-density parity-check (LDPC) codes were implemented and their performance compared. The (255,129) Reed-Solomon code provides a coding gain of 2.5 dB over uncoded data at a bit-en-or-rate of $10^{-4}$. UMTS and CCSDS turbo codes provide gains ranging from 6.8 dB to 9.5 dB for code rates ranging from 1/2 to 1/6. The DVB-S2 LDPC code provides a gain of 7.7 dB to 9.2 dB for rates from 1/2 to 1/4.

C. Geometrical Loss in Link Budget

The biggest losses in the link budget comes from the exponential path loss of light in water and from geometrical losses. In the simplest scenario of a well aligned and pointed system, consider the transmitter beam to have a divergence angle of $\theta_{div}$. Let d be the perpendicular distance between the transmitter and the receiver. At that distance, the transmitted beam would have an area (approximated using the small angle approximation):

$$A_{TX} = \frac{\pi}{4}(d \cdot \theta_{div})^2 \tag{5}$$

A receiver with diameter $D_{RX}$ has an area:

$$A_{RX} = \frac{\pi}{4}D_{RX}^2 \tag{6}$$

Geometric loss is then calculated as the ratio of receiver area to transmitter beam spot area at the receiver as:

$$Loss_G(d) = \frac{D_{RX}^2}{(d \cdot \theta_{div})^2} \quad (7)$$

Thus, it is desirable to have a large receiver aperture size. However, practical size, weight, and cost requirements limit aperture sizes.

D. Field of View and Pointing

One method of increasing aperture size is to use a light collecting lens in front of the smaller area optical detector. However, this limits the FOV of the receiver, adding additional pointing requirements.

The FOV of a typical photodiode can be between 60 to 120 degrees based on the type of packaging used. Adding a lens restricts the FOV severely, depending on the radius of the photodiode active area $r_{photodiode}$ and the focal length of the lens $f_{lens}$ as:

$$\phi = 2 \cdot \tan^{-1}\left(\frac{r_{photodiode}}{f_{lens}}\right) \quad (8)$$

The FOV is mostly limited by the imaging property of the lens: as the incoming beam enters the lens off-axis, the focal point moves laterally as a function of the tangent of the angle. Beyond a particular off-axis angle, the focal point starts to "walk off" the photodiode active area.

Even without the restrictions of a limited FOV at the receiver, free-space optical communications are inherently point-to-point. Hence the performance of a practical system depends on how well aligned the transmitter and receiver are. While bigger platforms can afford dedicated gimbal systems, smaller platforms do not have the volume or energy budget for sophisticated pointing and tracking.

E. Existing Systems and Methods
1) In underwater optical communication: Wide FOV is typically achieved using very large aperture devices such as photomultiplier tubes (PMT). They have very short rise times and wide spectral response, including the blue-green window of interest in underwater optical communication. PMTs also have a wide range of aperture sizes ranging from 10 mm to as high as 500 mm (20 inches) in diameter. These large-area PMTs have been used in underwater optical communication systems to avoid active pointing and tracking [1].
2) Modulating retroreflector: A modulating retroreflector can be used to address power, size, and pointing requirements at the receiver [14]. A modulating retroreflector eliminates the need for a transmitting laser on the data-bearing platform and reduces the pointing requirements by retroreflecting the modulated light back to the interrogating source. For the underwater environment, we have built a MEMS Fabry-Perot modulating retroreflector operating in the blue-green wavelengths and at data rates of 500 kbps and 1 Mbps[15]. This technology can also complement the diversity approaches described in Section III.
3) In indoor optical wireless: There has been some research in the domain of indoor optical wireless in the use of spherical photodiode arrays for increasing FOV [16]. Initial prototypes have been built and shown to be sufficient in low attenuation channels such as the indoor optical wireless channel [17].

The imaging property of a lens has been leveraged in the low attenuation indoor wireless channel by replacing the traditional single-element photodiode with a larger area segmented-photodiode [18]. Additionally, the use of compound parabolic concentrators instead of traditional spherical lenses have been shown to improve the performance of such systems. An improvement in range by a reduction in path loss, multipath distortion, and background noise has been shown by using such a system and by optimally combining the photodiode outputs [19].

4) In RF communications: Terrestrial RF communications have benefited from recent advancements in spatial diversity and smart antennas. A smart antenna is an antenna array with signal processing capable of 1. estimating direction of arrival and 2. beamforming. Advanced adaptive array systems are capable of focusing towards a desired signal while simultaneously nulling interferences. Mobile communications also provide insight towards some of the applications possible with an antenna with such capabilities. However, in optical systems, we do not have the RF advantage of being able to use coherent beamforming or phased arrays.

IV. Smart Receiver

The goal of the smart receiver research is to develop a quasi-omnidirectional system to reduce pointing and tracking requirements typically associated with free-space optical systems. The compound eye type lens array that has been developed has segmented wide FOV, which allows for other benefits in addition to the original goals.

In addition to potentially reducing pointing and tracking requirements, this design also potentially allows one to estimate angle of arrival. This can be used in combination with a CDMA type multiple access system. Thus, potentially, signals from different platforms can be distinguished from their coded signals and have an indication of their position. This opens the door for a large number of applications such as localization, navigation assistance, and mesh networking. Using multiple input multiple output (MIMO) techniques, this optical approach potentially also provides angle and spatial diversity for improving the performance of point-to-point links. Previous work in this area shows ideal methods to combine the output of such an array of photodiodes such as to maximize signal and minimize noise, without loss in bandwidth [20].

Figure 8:
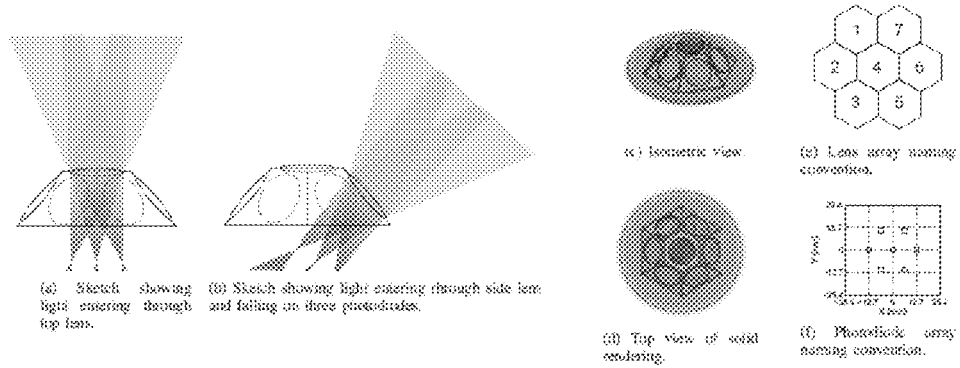
FIG. 8 illustrates the design of prototype lens-photodiode array. Lens-array is a truncated hexagonal pyramid structure with 7 lenses, underneath which is a planar photodiode-array consisting of 7 photodiodes. Solid renderings of the design are illustrated in (c) and (d). Sketches of side view in (a) and (b) show light entering through each lens and falling on multiple photodiodes. 49 such directions ("channels") exist for the prototype lens-photodiode array.
Figure 9:
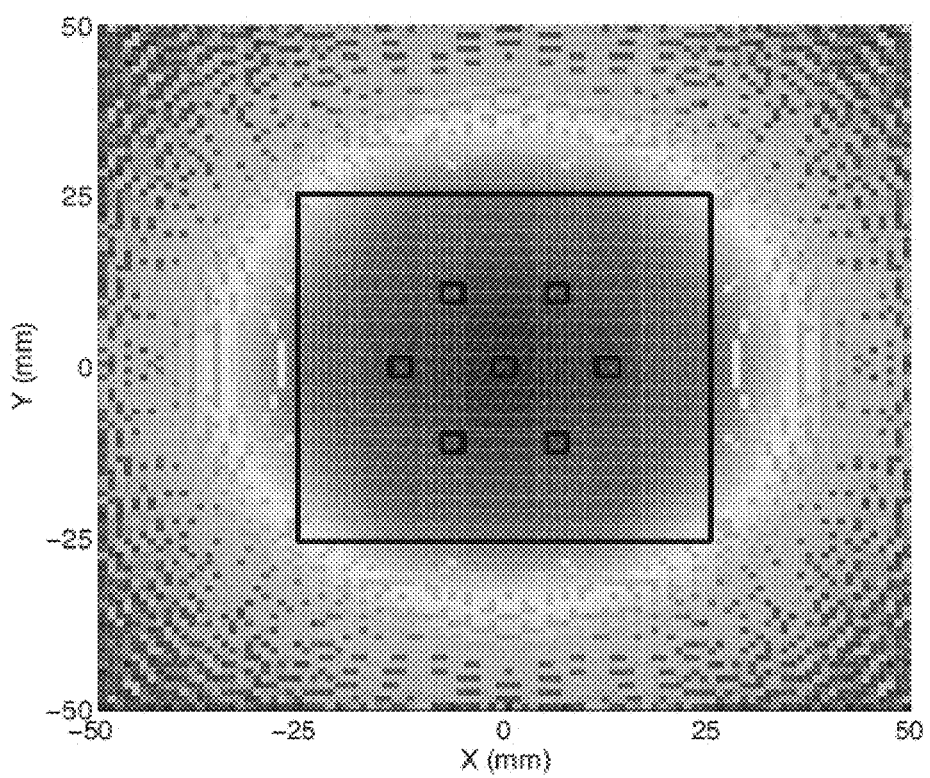
FIG. 9 illustrates an example simulation for a normal incident light source, visualizing combined receiver plane with summation of focal points (x-y plane) and their intensities. x-y plane is a 50 mm×50 mm receiver plane underneath lens array with (0,0) centered underneath, and 40 mm below the middle lens. Overlaid on the plot is the photodiode array placement. This type of simulation can be used to optimize photo diode placement to maximize light collected while also maximizing separation between photodiodes.

As such, the smart receiver has the following characteristics:
Increased field of view
Angle of arrival estimation A. Design and Conceptual Operation The proposed design consists of a 3-D spherical array of lenses all focusing to a 2-D planar array of photodiodes. Close packing is achieved by using a hexagonal structure for both arrays. A prototype has been constructed using seven lenses and seven photodiodes. FIGS. 8c and 8d show a solid rendering of the prototype lens head.

FIGS. 8a and 8b show a sketch of light entering through a single lens and falling on multiple photodiodes. For the prototype lens head, with 7 lenses and 7 photodiodes, there are 49 such lens-photodiode pairs.

B. Design Considerations

The following section discusses the different aspects of the design and their importance to underwater free-space optical communication.

1) Lens at the Receiver: Existing optical front-end arrays in terrestrial free-space optics and indoor optical wireless use either photodiode arrays with no lenses, a single lens with multiple photodiodes, or multiple lenses focusing on separate photodiodes. The proposed design is novel in that it uses an array of lenses as well as an array of photodiodes, with multiple combinations of optical paths in between.

2) Quasi-onmidirectionality: Increased FOV has been the primary design consideration for the optical front-end. Simulations and early experimental results show that the photodiode array under the middle lens increases the FOV from ~5° to ~40°. The addition of the outer lenses at 130° with respect to the middle lens increases the FOV to ~120°. The envelope of the combined FOV can be adjusted by additionally intentionally defocusing the photodiode array.

3) Angle of Arrival Estimation: The intensity of light received by each photodiode can be used to roughly estimate the angle of arrival of light. The hexagonal structure allows the receiver to estimate this angle with good resolution in the $0.5\pi$ steradian. (corresponding to $\pm 20°$ and a lesser resolution in the $3\pi$ steradian (corresponding to $\pm 60°$.

4) Photodiode Output Combining: Output combining is an important consideration for the performance of the system. The simplest interface to the array of photodiodes would be to connect them in parallel. This would allow a single output to be digitized for processing. However, the total capacitance would be the sum of the individual capacitances resulting in a much lower bandwidth. An ideal combining technique would maintain bandwidth, minimize noise, and maximize SNR.

Two simple linear diversity combining techniques are equal gain combining (EGC) and maximum selection combining (SEL). In an equal gain combiner, the receiver output signals are summed with equal weights to generate the combined signal. This can be represented as $$\hat{y} = y_1 + y_2 + \ldots + y_n \quad (9)$$

In selection combining, the receiver with the largest signal power at each instant of time is chosen as the combined signal. The combined signal is therefore $$\hat{y} = \max(y_1, y_2, \ldots, y_n), \quad (10)$$

where $y_1$ is the signal at the first receiver, $y_2$ is the signal at the second receiver, and $y_n$ is the signal at the $n^{th}$ receiver.

C. Modeling and Simulation

A model of the lens-photodiode array system was built in MATLAB and used to simulate light incident on the system to observe: the power at the face of each lens on the lens-array, the power at the receiver plane underneath the lens-array, and finally, the power at each photodiode at the photodiode-array. The goal of the model is to simulate different scenarios to select ideal parameters for the prototype to be constructed.

V. Smart Transmitter

The smart transmitter has the following characteristics:
Increased directionality
Electronic switched beamsteering A. Design and Conceptual Operation Similar to the smart receiver, the smart transmitter consists of a truncated hexagonal pyramid with seven LEDs. Unlike the receiver, each LED is coupled with its own lens that converges the wide FOV of the LED to a narrower beam in a particular direction. Each LED is uniquely addressed and driven, which allows the modulator to select an output direction. This forms the mechanism for a simple switched beamsteering at the transmitter.

For a multi-user environment it is important to provide multiple access to the medium LEDs at different wavelengths can be used, but receivers would need multiple filters. Time Division Multiple Access would require synchronous clocks. Among asynchronous methods, Code Division Multiple Access (CDMA) was chosen as the multiple access scheme.

B. CDMA Coding

CDMA techniques have been extensively studied and used in RE communications. Incoherent optical detection and processing make typical RF maximum length and Gold code sequences not ideal. The on-off-keying modulation methods in optical communication are unipolar as opposed to the bipolar modulation required by Gold codes. Instead optical CDMA typically uses prime codes [21].

Prime codes of length $N=P^2$ are obtained from prime sequences of prime number length P generated from a Galois Field GF(P). Here we use P=5 to generate a code of length 25, which is then zero padded to N=32. The code was simulated for K=5 users. The theoretical SNR can be calculated using the below equation [21] as 14.4 dB.

$$SNR_{prime,th} \approx \frac{1}{0.29}\left[\frac{N}{K-1}\right] \quad (11)$$

Figure 10:
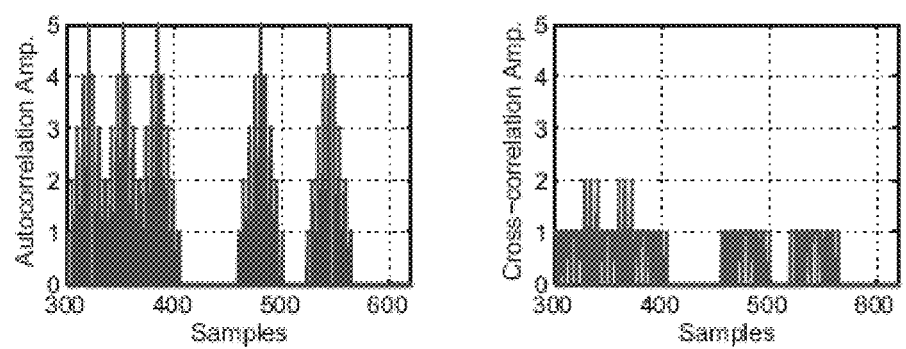
FIG. 10 illustrates simulation correlator outputs for the data sequence "111001010" spread using a 32-chip prime code sequence of P=5 with 7 padding zeros.
Figure 11:
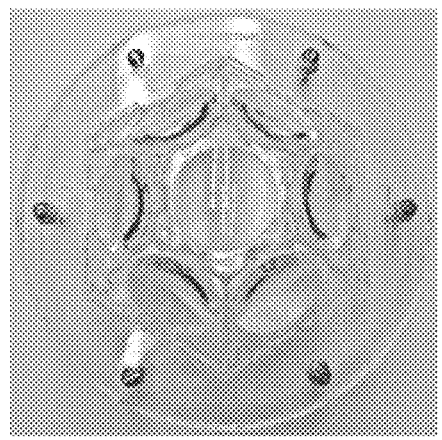
FIG. 11 is a top view image of a prototype receiver lens-array constructed in accordance with an embodiment of the subject matter described herein.
Figure 12:
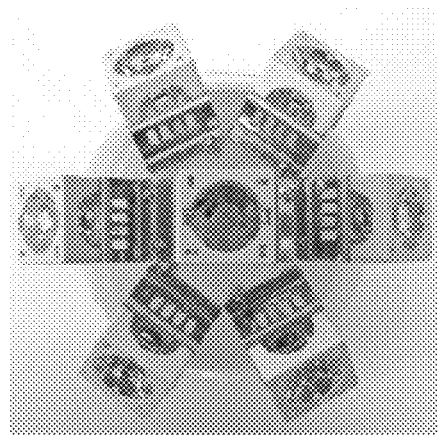
FIG. 12 is a top view Image of a prototype transmitter LED-array constructed in accordance with an embodiment of the subject matter described herein.

FIG. 10 shows the autocorrelation and cross correlation function for the data sequence 111001010 coded with the prime code. The empirical SNR is obtained as the ratio of the square of the maximum of the autocorrelation function to the sum of the variances of the cross correlations with the interferers, and found to match the theoretical SNR.

The particular length prime code chosen allows for 5 simultaneous users. This is sufficient for the initial prototype. A longer code sequence will decrease overall bandwidth but allow for more users with a corresponding increase in SNR.

VI. Experimental Results

Prototype lens-photodiode arrays and LED-arrays were constructed for the receiver and transmitter front-ends and used to collect experimental data. At the receiver, a 7-channel electronics front-end was designed and built to pre-amplify and digitize the receiver outputs. At the transmitter, a 7-channel electronics front-end was designed and built to receive up to seven different streams of data from an FPGA and drive up to seven different LEDs on the TED-array. The underwater channel used was the 3.66 m long laboratory water tank previously described. The channel conditions were adjusted by the controlled addition of liquid Maalox as a scattering agent, and the resulting attenuation coefficient was measured using a WET Labs C-Star transmissometer.

The different experiments conducted are for the primary purpose of characterizing the receivers and transmitters, as well as to serve as a demonstration of their capabilities. First, a characterization of the lens-photodiode array is conducted, then an algorithm to extract angle of arrival information is discussed and its results presented. The lens-photodiode array is then used to measure the amount of backscatter from a co-located transmitter and its relationship to the changing attenuation coefficient of the water is shown. For diversity combining, two different techniques are implemented and their results given. Finally, an experiment using two transmitters simultaneously transmitting to a single receiver is conducted. The different experiments are detailed in Sections A-E below.

A. Characterization of the Receiver Lens-Photodiode Array

Experiments were first conducted to characterize the responsivity of the prototype receiver's lens-photodiode array as a function of the incident light, and in turn derive its FOV. Experiments were conducted for the receiver pointed in all directions in a $2\pi$ steradian and intensities were observed at all photodiode outputs stored as a function of the spherical co-ordinates $(\theta, \Phi)$ with $0 \leq \theta \leq \pi/2$ and $0 \leq \Phi \leq 2\pi$. A pan and rotate system was constructed using digital servos and was used to point the array towards a constant, expanded, white light source: The seven amplified photodiode outputs were digitized using a simultaneous 8-channel digitizer. Four separate experiments were then conducted for four different lens-photodiode separations, 40, 50, 60, and 70 mm.

Figure 13:
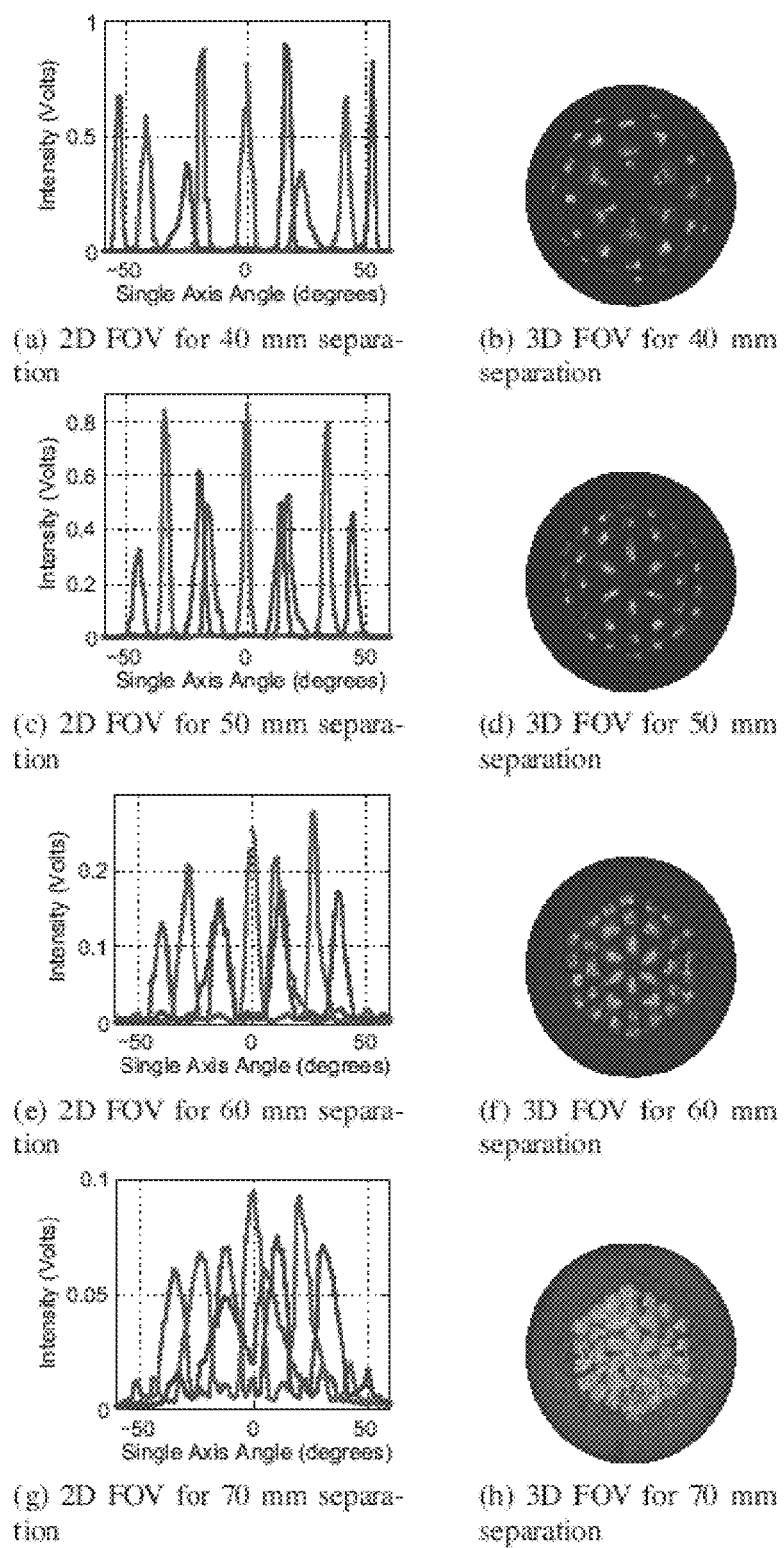
FIG. 13 illustrates a single-axis two-dimensional FOV (left) and three-dimensional FOV (right) plots for four different separations between lens-array and photodiode-array. 3D FOV is a top-view of responsivities plotted on a spherical surface corresponding to $(\theta, \Phi)$ of incident light. $\theta=0°$ lies at the center and increases outwardly till $\theta=90°$ at the edge of the hemisphere. $\Phi=0°$ points south and increases clockwise. $\Phi=180°$ points north.

Graphs showing the two-dimensional (single-axis) and three-dimensional FOV for each of the four separation distances between the lens-array and photodiode-array are included in FIG. 13. As this separation determines the distance between the focal points of each lens and the receiver plane, increasing separations defocus the focal point to a conic section projection. The 2D FOV shows the individual lens-photodiode pair FM's along one axis of the lens-photodiode array, while the 3D FOV shows all possible lens-photodiode pair FOVs formed. The plots also help visualize the segmented wide-FOV, which has been the primary design goal. Among many parameters, the separation between the lens-array and the photodiode-array can be used to control the width and overlap between the single FOVs, as well as the total FOV. As anticipated, increasing the separation between the lenses and photodiodes defocuses the focal points and effectively widens each individual lens-photodiode FOV. The smaller separation distance of 40 mm gives the maximum total FOV at ~120°, and the larger separation distance of 70 mm gives the least total FOV at ~90°. However, the increased total FOV comes at the expense of larger gaps between the individual FOVs. By the same mechanism, smaller gaps between the individual FONTs and more overlap between the individual FOVs is achieved at the expense of decreased total FOAL.

B. Angle of Arrival Estimation

Angle of arrival estimation involves estimating the direction of arrival of the incident light based on the relative output powers observed at each photodiode. The preliminary algorithm explored here uses the uniqueness of the relationship between the photodiode outputs to potentially extract the angle of arrival.

The approach taken is based on a look-up table traversal generated using characterization data previously collected. Effectively, the seven receiver outputs at each instant are sorted and compared against all possible receiver output patterns. The angle corresponding to the best match is chosen as the estimated angle. The best match is defined as, and obtained by, the look-up table location that is the closest match for the channel with the most power, followed by the next most power and so on.

Figure 14:
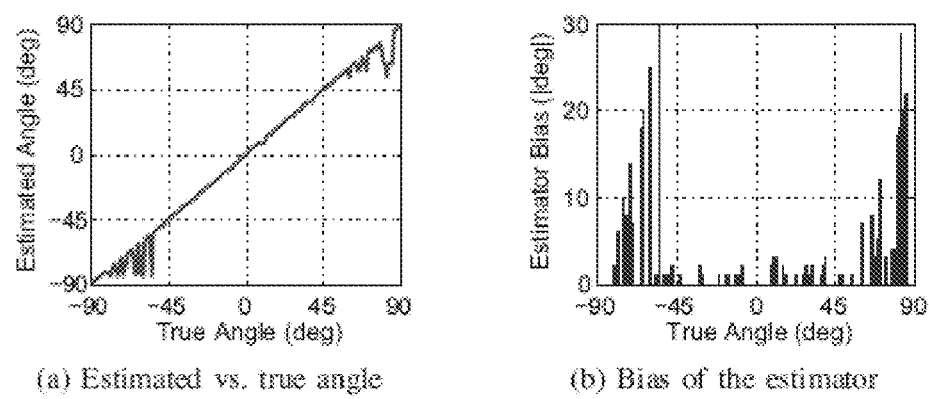
FIG. 14 illustrates results for the single-axis angle of arrival estimation algorithm investigated show low bias within the combined field of view of the lens-photodiode array. Results shown are for the experimental data collected using 60 mm separation between lens array and photodiode array.

The result of this algorithm is shown in FIG. 14. The algorithm matches angle of arrivals with low error within the combined FOV of the lens-photodiode array. Simulated noise was added to observe the degradation of the performance and it was noted that the algorithm continued to perform well in regions of transition between the individual lens-photodiode FOVs.

While the design allows for a look-up table-based algorithm to be used in estimating the single-axis angle of arrival with reasonable accuracy, estimating the three-dimensional spherical angle ($\theta$, $\Phi$) is more complicated. One possible solution is to use an algorithm similar to Markov localization. Such an estimator would incorporate prior and posterior probabilities for the estimate, including a convolution between the measurements. Such a convolution can be intentionally introduced by rotating the receiver by a known $\Phi''$ between measurements. The convolution can also arise from movement of the platform the receiver is mounted to.

C. Backscatter Estimation

A smart transmitter can perform estimation of the water quality by using its backscattered return light and a co-located receiver to estimate the attenuation coefficient (channel state) of the channel at the transmitter. This technique has the advantage of knowing the water quality without relying on a back-channel for back-telemetry or even a separate instrumentation sensor. Knowing this information allows the transmitter to, for example, adaptively change its transmit power, data rate, code rate, or other parameters. The challenge to this technique is that the return beam from backscatter, depending on the attenuation coefficient of the channel, can be as low as approximately six orders of magnitude below the output power of the transmitter. To some extent, this can be solved by a few methods including, but not limited to: sending a higher power training sequence for the purpose of increasing the amount of backscattered light used for estimation, the receiver correlating the captured light to the actual data being transmitted, or even temporarily increasing the receiver gain. Techniques such as the use of a lock-in amplifier can also be used and are aided by the fact that the transmitter and the backscatter-receiver are co-located.

Figure 15:
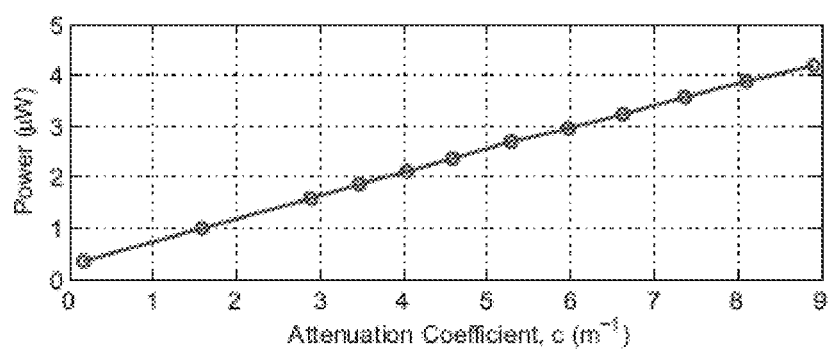
FIG. 15 illustrates results of the backscatter estimation experiment showing linear relationship between power of the backscattering from transmitted light as measured by its adjacent receiver, and the true attenuation coefficient measured using a transmissometer suspended in the water during the experiment.

Experiments were conducted with commercial off-the-shelf amplified detectors as well as the prototype transmitter and receiver to collect and observe a linear relationship between the known attenuation coefficient of the water and the amount of backscattered light collected. For this purpose, during experimentation, a transmissometer was introduced in the water to collect true attenuation coefficient measurements. The attenuation coefficient was changed as previously mentioned by the addition of Maalox. Results are shown in FIG. 15.

The results provide a measure of the integral of the full range of backscattering angles. However, no attempt is made to extract an actual backscattering coefficient from these measurements. Such measurements are technically difficult [22]. Exact measurements, although required for an instrumentation device, are not necessary for some schemes of adaptive communication. An instrumentation device would also have a small or no separation of distance between the light source and the detector. However, the relationship to attenuation coefficient is linear and, after calibration, can be used to set the output power of the transmitter in order to compensate for water conditions.

D. Diversity Combining

Diversity combining is the process of combining the multiple outputs from the receiver front-end in order to provide a single improved signal for processing. The two types of combining techniques investigated here are equal gain combining (EGC) and selection combining (SEL). In a typical communications system over a fading channel, the multiple receivers typically observe copies of the same signal with time-varying power levels. However, in the case of this particular receiver front-end introduced herein, the receiver front-end is analogous to an angular diversity system. As such, it is not always desirable to sum all receiver outputs together with equal gain as one would with EGC.

For the purposes of quantifying the detrimental effects of EGC, an experiment was conducted using a single 7-channel transmitter and a single 7-channel receiver, both of which were stationary during the duration of the experiment. First, the receiver channel pointed towards the transmitter was considered. From that point, other receiver channels, not oriented towards the transmitter, were added incrementally, until all seven channels were considered.

Figure 16:
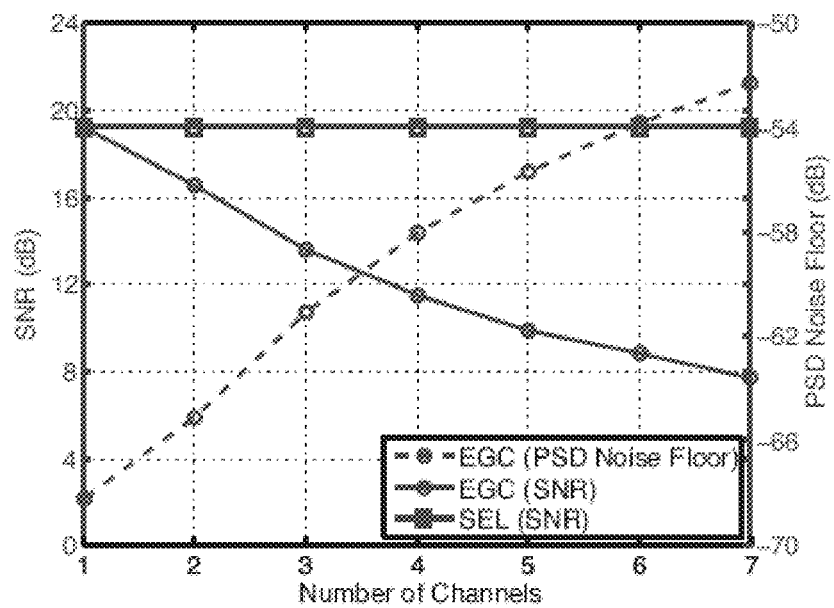
FIG. 16 illustrates SNR and noise floor of the power spectral density (PSD), for equal gain combining (EGC) and selection combining (SEL), as the number of channels are added incrementally. Only one receiver is pointed towards and actively receiving data from the transmitter in this experimental scenario.

The results are plotted in FIG. 16. As expected, SEL combining always switches to the channel with the most power, while EGC gets incrementally worse as more channels are added. The testis diversity is used loosely to imply that in a mobile situation, the channel with the most power changes as users change position. The combining technique is implemented on a packet basis and will select the ideal receiver channels as positions change. The SNR estimator used saturates below 10 dB and therefore an additional metric, the noise floor of the power spectral density of the combined signal, is also included in the figure for reference.

It is possible that in waters with very high attenuation coefficients, the multiply scattered photons typically carry more power than ballistic photons and as result will result in power at multiple receiver channels simultaneous. In this case, a more efficient combining technique such as maximum ratio combining will potentially be advantageous. More work is needed to study this scenario.

E. Multi-user: CDMA and SDMA

One of the advantages of the proposed design is the spatial division multiple access (SDMA) inherent to the design. However, this is not applicable in two scenarios: first, when two or more transmitters are co-located, and second, when two or more different signals arrive at the same photodiode through two different lenses. In either case, SDMA is not applicable, and for this reason, code division multiple access (CDMA) spreading is employed at the transmitter. The codes used and their properties have been detailed in a previous section. Here, we experimentally validate simultaneous channel access using CDMA.

Figure 17:
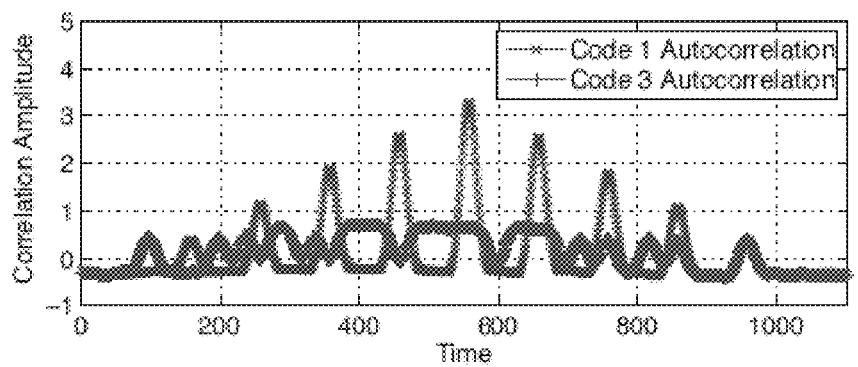
FIG. 17 illustrates correlation of the received signal at User B from two different transmitters, User A and User C, with their outputs spread using the respective CDMA codes 1 and 3. Graph shown is for a bit "1" spread using two different 32-chip prime codes. The bits are intentionally synchronized between the two transmitters for the sake of comparison, although synchronization between the transmitters is not required.
Figure 17:
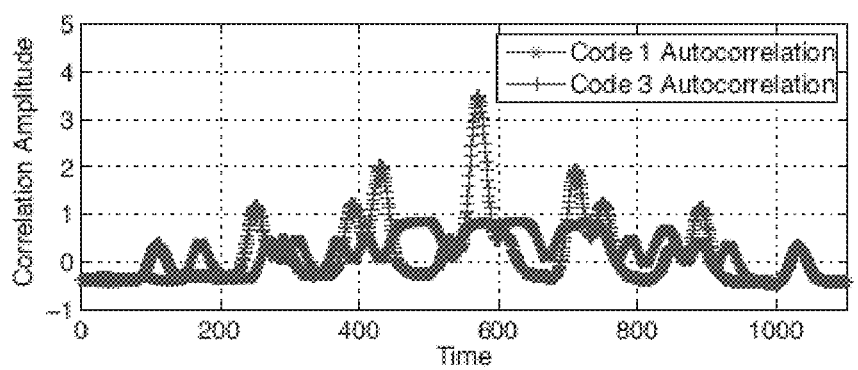
Figure 17:
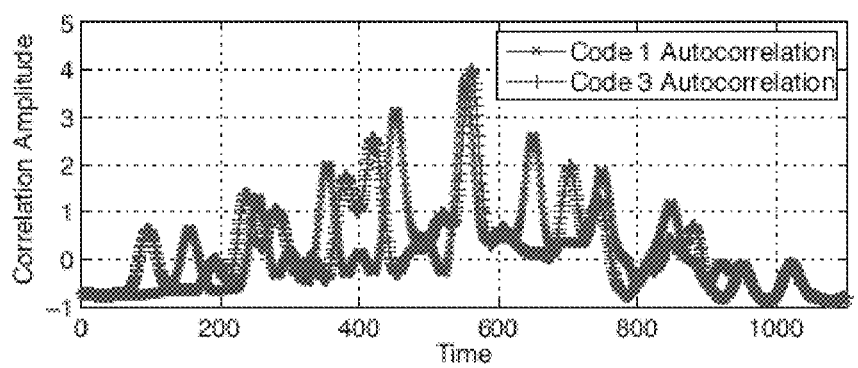

An experiment was conducted through water, with the receiver (User B) at the end of the tank, and two co-located transmitters (Users A and C) at the other end. Data was collected for the instances where only user A is transmitting, only user C is transmitting, and when both users A and C are simultaneously transmitting. The signal received at the receiver was digitized and processed with their results shown in FIG. 17. The results in FIGS. 17a and 17b show strong correlation in the absence of interferers. FIG. 17c is consistent with theory as well, and shows multiple access interference (MAI) inherent to asynchronous multi-user CDMA. Although this degrades performance, a code-matched filter and multi-user detection techniques such as a decorrelating detector can be used to decouple users.

VII. Discussion

Freespace optical communication is inherently line-of-sight and hence highly dependent on the field of views of, and pointing and tracking between, transmitters and receivers. The goal of the description herein has been to present one method of relaxing these requirements. The results show that in addition to satisfying this goal, the design is also capable of acting as a "smart" system with the additional sensing capabilities at the receiver and the control capabilities at the transmitter.

The characterization experiments reveal that it is possible to extend the directed FOV of a single lens-photodiode pair in multiple directions using the design described herein. It is also shown that, while the combined FOV has "nulls" in sensitivity, this can be mitigated by intentionally defocusing the receiver plane. The angle of arrival estimation algorithm presented, although preliminary, serves as a proof-of-concept that a simple pattern matching algorithm can obtain a single-axis angle of arrival. It is proposed that a more advanced precoding-based or Markov localization-based algorithm can provide a three-dimensional estimate. The backscatter estimation experiment demonstrates a linear relationship between the return beam intensity and channel attenuation coefficient. It is anticipated that higher level controls are required to coordinate the gain changes at the receiver required during this process, as well as that some calibrations are necessary to extend the laboratory tank measurements to the "real world."

Through diversity combining experiments, it can be seen that selection combining is a better alternative to equal gain combining in an angular diversity scenario. However, it is expected that in highly scattering environments, an optimal maximum ratio combiner is desirable. Preliminary multi-user experiments conducted show that although CDMA is required in certain alignments of users, the design inherently acts as a spatial division multiple access system. Further experiments are necessary to verify whether, in a highly scattering environment in coordination with the CDMA coded transmitter outputs, a diversity combiner similar to techniques used in a RAKE receiver is beneficial.

The block diagram shown in FIG. 18 takes advantage of the design and its capabilities to illustrate a closed-loop scenario. The output from the angle of arrival estimator is used by the transmitter to switch LEDs, and thus electronically beamsteer its outputs. The output from the backscatter estimator is used to adjust the output power of the LEDs and, if necessary, other parameters such as the data rate and code rate. Currently, all processing takes place offline on a PC running MATLAB. However, the hardware constructed is capable of implementing this proposed closed-loop scheme on a field programmable gate array or other embedded digital signal processor.

VIII. Conclusion

The disclosure herein demonstrates the feasibility of implementing smart transmitters and receivers for free-space underwater optical communication systems and presents data obtained in a tank designed to simulate ocean water conditions. The smart receivers have increased field of view and the ability to estimate angle of arrival. The transmitters are quasi-omnidirectional, allow electronic switched beamsteering, and with an adjacent receiver, enable estimation of water quality by measuring the optical backscatter from transmitted light. This smart transceiver approach mitigates pointing and tracking requirements, which can be difficult for underwater platforms and enable adaptive communication techniques, which are expected to be useful due to the variable dynamic range of the communications signal as platforms change relative range and pose. Thus, we anticipate that implementations such as those presented combined with CDMA and other coding techniques will be useful in enabling a physical layer for networking schemes in swarms of unmanned underwater vehicles in the future.

The disclosure of each of the following references is incorporated herein by reference in its entirety.

REFERENCES

[1] C. Pontbriand, N. Farr, J. Ware, J. Preisig, and H., Popenoe, "Diffuse high-bandwidth optical communications," in *Proc. OCEANS Conf.* 2008, Quebec, Canada, September 15-18 2008.

[2] B. Cochenour, L. Mullen, and A. Laux, "Phase Coherent Digital Communications for Wireless Optical Links in Turbid Underwater Environments," in *Proc. OCEANS Conf* 2007, Vancouver, B C, Canada, 2007.

[3] M. Doniec, I. Vasilescu, M. Chitre, C. Detweiler, M. Hoffmann-Kuhnt, and D. Rus, "AquaOptical: A lightweight device for high-rate long-range underwater point-to-point communication," in *Proc. OCEANS Conf.* 2009, Biloxi, M S, Oct. 26-29 2009.

[4] F. Hanson and S. Radic, "High bandwidth underwater optical communication," *Applied Optics*, vol. 47, no. 2, p. 277, January 2008.

[5] W. C. Cox, "A 1 Mbps Underwater Communication System Using a 405 nm Laser Diode and Photomultiplier Tube," M. S. thesis, North Carolina State University, Raleigh, 2007.

[6] J. A. Simpson, "A 1 Mbps Underwater Communications System using LEDs and Photodiodes with Signal Processing Capability," M. S. thesis, North Carolina State University, Raleigh, 2007.

[7] C. D. Mobley, *Light and water: radiative transfer in natural* waters. San Diego Academic Press, 1994.

[8] C. Mobley, "Ocean Optics Web Book," 2011. [Online]. Available: http://www.oceanopticsbook.info/

[9] W. C. Cox, "Simulation, Modeling, and Design of Underwater Optical Communication Systems," Ph.D. dissertation, North Carolina State University, Raleigh, 2012.

[10] B. M. Cochenour, L. J. Mullen, and A. E. Laux, "Characterization of the Beam-Spread Function for Underwater Wireless Optical Communications Links," *IEEE J. Ocean. Eng.*, vol. 33, no. 4, pp. 513-521. October 2008.

[11] L. Mullen, D. Alley, and B. Cochenour, "Investigation of the effect of scattering agent and scattering albedo on modulated light propagation in water," *Applied Optics*, vol. 50, no. 10, p. 1396, March, 2011.

[12] J. Everett, "Forward-Error Correction Coding for Underwater Freespace Optical Communication," M. S. thesis, North Carolina State University, Raleigh, 2009.

[13] J. A. Simpson, W. C. Cox, J. R. Krier, and B. Cochenour, "5 Mbps optical wireless communication with error correction coding for underwater sensor nodes," in *Proc. OCEANS Conf.* 2010, Seattle, Wash., 2010.

[14] W. Rabinovich, R. Mahon, P. Goetz, E. Waluschka, D. Katzer, S. Binari, and G. Gilbreath, "A cat's eye multiple quantum-well modulating retroreflector," *IEEE Photonics Techn. Lett.*, vol. 15, no. 3, pp. 461-463, March 2003.

[15] W. C. Cox, K. F. Gray, J. A. Simpson, B. Cochenour, B. L. Hughes, and J. F. Muth, "A MEMS Blue/Green Retroreflecting Modulator for Underwater Optical Communications," in *Proc. OCEANS Conf.* 2010, Seattle, Wash., 2010.

[16] J. Akella, C. Liu, D. Partyka, M. Yuksel, S. Kalyanaraman, and P. Dutta, "Building blocks for mobile free-space-optical networks," in *WOCN* 2005, 2005.

[17] A. Sevincer, M. Bilgi, M. Yuksel, and N. Pala, "Prototyping Multi-Transceiver Free-Space Optical Communication Structures," in *Int. Conf. on Communications* 2010, 2010.

[18] A. Tang, J. Kahn, and K. Ho, "Wireless infrared communication links using multi-beam transmitters and imaging receivers," in *Int. Conf. on Communications* 1996, vol. 1., 1996.

[19] J. Carruther and J. Kahn, "Angle diversity for nondirected wireless infrared communication," *IEEE Transactions on Communications*, vol. 48, no. 6, pp. 960-969, June 2000.

[20] J. A. Simpson, B. L. Hughes, and J. F. Muth, "A spatial diversity system to measure optical fading in an underwater communications channel," in *Proc. OCEANS Conf.* 2009. Biloxi, M S: IEEE, 2009.

[21] P. Prucnal and M. Santoro, "Spread spectrum fiber-optic local area network using optical processing," *J. Lightwave Technology*, vol. 4, no. 5, pp. 547-554, 1986.

[22] D. Haubrich, J. Musser, and E. S. Fry, "Instrumentation to measure the backscattering coefficient b(b) for arbitrary phase functions." *Applied optics*, vol. 50, no. 21, pp. 4134-47, July 2011.

What is claimed is:

1. A system for smart underwater free space optical communications, the system comprising:
   a receiver including:
      an optical detector array for detecting incident light under water;
      a compound lens array located optically in front of the optical detector array, wherein the compound lens array includes lenses that steer incident light arriving at different angles to different portions of the optical detector array, wherein the compound lens array comprises a truncated hexagonal pyramid having a lens on each face other than a base; and
      a controller for processing signals generated by the optical detector array based on the incident light and for controlling an aspect of the underwater communications based on the steered incident light detected by the detector array.

2. The system of claim 1 wherein the detector array comprises a photodiode array, a photomultiplier tube array, or other array of detectors of photons.

3. The system of claim 1 wherein the lenses are arranged such that each lens steers light arriving at a particular angle or range of angles to a particular detector in the detector array.

4. The system of claim 1 wherein the controller includes an angle of arrival estimator configured to estimate an arrival angle of the incident light and wherein the controller is configured to adjust an attitude of an underwater vehicle based on the estimated arrival angle.

5. The system of claim 1 comprising a transmitter, wherein the controller is configured to adjust a parameter of transmitted optical signals based on the signals generated by the detector.

6. A system for smart underwater free space optical communications, the system comprising:
   a receiver including:
      an optical detector array for detecting incident light under water;
      a compound lens array located optically in front of the optical detector array, wherein the compound lens array includes lenses that steer incident light arriving at different angles to different portions of the optical detector array; and
      a controller for processing signals generated by the optical detector array based on the incident light and for controlling an aspect of the underwater communications based on the steered incident light detected by the detector array;
      wherein the controller is configured to adjust a parameter of transmitted optical signals based on the signals generated by the detector and
      wherein the controller includes a backscatter estimator for estimating water quality based on backscattered light and for adjusting a transmit parameter based on the estimated water quality.

7. The system of claim 6 wherein the parameter includes a transmit power data rate, or code rate.

8. The system of claim 5 wherein the transmitter and the receiver are components of an autonomous underwater vehicle.

9. The system of claim 5 wherein the transmitter and the receiver are components of a stationary underwater object.

10. The system of claim 5 wherein the transmitter includes an optical transmitting element array and a compound lens array located optically in front of the compound lens array for transmitting light emitted from the optical transmitting element array in different directions.

11. The system of claim 1 wherein the controller includes an angle of arrival estimator for estimating an angle of arrival of incident light.

12. A method for smart underwater optical communications, the method comprising:
- in a receiver, detecting, using an optical detector array, incident light arriving from an underwater source;
- steering, using a compound lens array located in front of the optical detector array, incident light arriving at different angles to different portions of the optical detector array, wherein the compound lens array comprises a truncated hexagonal pyramid having a lens on each face other than a base; and
- processing signals generated by the optical detector array based on the incident light and controlling an aspect of the underwater communications based on the steered light detected by the detector array.

13. The method of claim 12 wherein the detector array comprises a photodiode array, a photomultiplier tube array, or other array of detectors of photons.

14. The method of claim 12 wherein steering the incident light includes steering light such that light arriving at a particular angle or range of angles is detected by a particular detector in the detector array.

15. The method of claim 12 wherein controlling an aspect of the underwater communications based on the signals generated by the optical detector includes estimating an angle of arrival of the incident light and controlling an attitude of an underwater vehicle based on the estimated angle of arrival.

16. The method of claim 12 comprising, in a transmitter, adjusting a parameter of transmitted optical signals based on the signals generated by the detector.

17. A method for smart underwater optical communications, the method comprising:
- in a receiver, detecting, using an optical detector array, incident light arriving from an underwater source;
- steering, using a compound lens array located in front of the optical detector array, incident light arriving at different angles to different portions of the optical detector array; and
- processing signals generated by the optical detector array based on the incident light and controlling an aspect of the underwater communications based on the steered light detected by the detector array;
- comprising, in a transmitter, adjusting a parameter of transmitted optical signals based on the signals generated by the detector and
- wherein adjusting a parameter of transmitted optical signals comprises estimating water quality based on back-scattered light and adjusting the parameter based on the estimated water quality.

18. The method of claim 17 wherein the parameter includes transmit power, data rate, or code rate.

19. The system of claim 12 comprising estimating an angle of arrival of incident light.

20. The method of claim 16 wherein the transmitter and the receiver are components of an autonomous underwater vehicle.

21. The method of claim 16 wherein the transmitter and the receiver are components of a stationary underwater object.

22. A non-transitory computer readable medium having stored thereon executable instructions for controlling the processor of a computer to perform steps comprising:
- in a receiver, detecting, using an optical detector array, incident light under water;
- steering, using a compound lens array located optically in front of the optical detector array, incident light arriving at different angles to different portions of the optical detector array, wherein the compound lens array comprises a truncated hexagonal pyramid having a lens on each face other than a base; and
- processing signals generated by the optical detector array based on the incident light and controlling an aspect of underwater communications based on the steered light detected by the detector array.

* * * * *